(12) United States Patent
Taylor (10) Patent No.: US 6,478,128 B2
(45) Date of Patent: Nov. 12, 2002

(54) REDUNDANT FREEWHEELING BICYCLE APPARATUS AND METHOD

(76) Inventor: Anthony G. Taylor, 111 Mira Monte Rd., Grand Junction, CO (US) 81503

( * ) Notice: Subject to any disclaimer, the term of this patent is extended or adjusted under 35 U.S.C. 154(b) by 0 days.

(21) Appl. No.: 09/623,290

(22) PCT Filed: Sep. 29, 1999

(86) PCT No.: PCT/US99/22691
§ 371 (c)(1),
(2), (4) Date: Sep. 1, 2000

(87) PCT Pub. No.: WO00/19120
PCT Pub. Date: Apr. 6, 2000

(65) Prior Publication Data
US 2002/0003076 A1 Jan. 10, 2002

Related U.S. Application Data
(60) Provisional application No. 60/102,512, filed on Sep. 30, 1998.

(51) Int. Cl.[7] ................................................ F16D 41/36
(52) U.S. Cl. ........................ 192/64; 192/69.81; 192/108
(58) Field of Search ...................... 192/64, 46, 56.61, 192/69.81, 89.21, 108, 70.13, DIG. 1

(56) References Cited

U.S. PATENT DOCUMENTS

| | | |
|---|---|---|
| 3,187,870 A | 6/1965 | Sabatini |
| 3,458,019 A | 7/1969 | Fant et al. ..................... 192/42 |
| 3,865,220 A | 2/1975 | Thompson ................... 192/46 |
| 4,046,238 A | 9/1977 | Mendoza-Orozco ......... 192/45 |
| 4,261,452 A | 4/1981 | Barrows ....................... 192/42 |
| 4,276,973 A | 7/1981 | Fukui ........................... 192/47 |
| 4,324,323 A | 4/1982 | Campagnolo ................ 192/64 |
| 4,363,390 A | 12/1982 | Eisend et al. ................. 192/46 |
| 4,437,552 A | 3/1984 | Tyama .......................... 192/26 |
| 4,593,799 A | 6/1986 | Ozaki ........................... 192/46 |
| 4,840,250 A | 6/1989 | Novy ........................... 181/175 |
| 4,903,809 A | 2/1990 | Kiblawawi et al. ........... 192/98 |

(List continued on next page.)

FOREIGN PATENT DOCUMENTS

| | | |
|---|---|---|
| CH | WO 099/04988 A1 | 6/1998 |
| WO | WO 00/19120 | 4/2000 |

OTHER PUBLICATIONS

Hugi Hubs Reviews, Hugi website, http://www.mtbr.com/reviews/Hub/hugi_hubs.html, Sep. 21, 1999, 17 pages.
McMaster–Carr catalog, Jun. 1, 1999, pp 3033, 3034, 3047, 3046, 3043, 3001, 2912, 2906, and two other pages.
DT Swiss Ltd.—Hubs website, http://www.dtswiss.com/en/naben.html, Sep. 21, 1999, 15 pages.
DT HuGT swiss made Technical Manual in English, Version 3, 01/96, pp 1–26.
Bottom Brackets • Hubs • Skewers, Colorado Cyclist, spring 1998, p. 50.
Hubs, Excel, fall 1998, p. 30.
US Application 60/102,512, entitled "Improved, Splined Ratchet Style Bicycle Hub Using Secondary Pressure Spring", filed Sep. 30, 1998 (transmittal letter).

*Primary Examiner*—Rodney H. Bonck
(74) *Attorney, Agent, or Firm*—Santangelo Law Offices, P.C.; Luke Sangangelo; Alfred K. Weidmann, Jr.

(57) ABSTRACT

A hub and methods of propulsion thereof are disclosed wherein fail safe engagement is provided for particular components of a hub assembly. Preferred embodiments may provide for a secondary pressure spring which provides redundancy to a first pressure spring to ensure engagement of particular drive elements. Additional preferred embodiments may provide back-up drive elements as a replacement for drive elements of the hub.

108 Claims, 3 Drawing Sheets

U.S. PATENT DOCUMENTS

| | | | | |
|---|---|---|---|---|
| 4,913,500 A | | 4/1990 | Wauke et al. | 301/105 B |
| 5,143,189 A | | 9/1992 | Meier-Burkamp | 192/64 |
| 5,188,205 A | | 2/1993 | Karp et al. | 192/46 |
| 5,322,487 A | | 6/1994 | Nagano | 475/297 |
| 5,351,922 A | * | 10/1994 | Lindsay | 192/56.61 X |
| 5,390,773 A | | 2/1995 | Proia | 192/45 |
| 5,396,975 A | * | 3/1995 | Robinson | 192/108 X |
| 5,460,254 A | | 10/1995 | Huang | 192/64 |
| 5,515,957 A | | 5/1996 | McConaghy | 192/64 |
| 5,632,364 A | | 5/1997 | Mercat | 192/64 |
| 5,669,477 A | | 9/1997 | Chen | 192/64 |
| 5,676,227 A | | 10/1997 | Hugi | 192/64 |
| 5,921,363 A | * | 7/1999 | Chiang et al. | 192/64 |
| 5,964,332 A | | 10/1999 | King | 192/64 |
| 6,065,580 A | * | 5/2000 | Kirk | 192/64 X |
| 6,123,179 A | * | 9/2000 | Chen | 192/64 |

* cited by examiner

REDUNDANT FREEWHEELING BICYCLE APPARATUS AND METHOD

This application is the United States National Stage Application of International Application No. PCT/US99/22691, filed Sep. 29, 1999, which claims the benefit of U.S. Provisional Application No. 60/102,512, filed Sep. 30, 1998, each hereby incorporated by reference.

BACKGROUND OF THE INVENTION

This invention relates to a secondary pressure spring to be installed behind a stationary star ratchet in the free hub of an existing design. Specifically, this invention makes active a stationary star ratchet and provides a fail safe from accidental losses in engagement, quicker engagement, less frictional resistance, and decreased noise when in the free wheel mode.

A rear bicycle hub is generally attached to the rim by a series of criss-crossed steel spokes and the wheels make up an integral part of the bicycle. A conventional rear bicycle hub, whether a road bike, a mountain bike, or a tandem bike, require some form of a drive assembly (free hub) to engage or disengage the hub from a drive mode or a free wheel mode. A rear hub generally contains bearings, an axle, some form of drive assembly (free hub), and an array of gears called a cog set that is driven by a chain and shifted via a rear derailer. The most common drive assembly uses two or three pawl ratchets inside of a steel guide ring. The pawls, which are the male portions of the assembly, are spring loaded and evenly spaced around the insertion part of the free hub. These pawls require that a cooperating ring which is the female portion of the assembly, has a series of unidirectional, evenly spaced, ramped teeth that allows the pawls to rotate within. As the free hub is rotated the forward direction (or drive mode) the pawls spring into the female ring's unidirectional teeth and lock the free hub into engagement and the bicycle is propelled forward. Whether coasting down a hill (no pedaling but the bicycle is moving) or pedaling backwards, the free hub disengages and the ramped portion of the guide ring and pawls separate and the pawls float on the springs making a ratcheting noise, this is called a free wheel. This free hub mechanism is the quintessential element in today's bicycles for freedom in quick engagement, pedal location, and coasting.

The failure of the rear hub drive assembly is frequently attributed to the breakage of the pawls and springs. Though these materials are hardened steel, over time the pawls can become weakened and break. There are a number of variables why hubs fail, but in particular, design inefficiencies are the main reasons. There is, therefore, a recognized need for a fail safe that will prevent the bicycle hub from failing while under load. It is the objective of the present invention to provide such a fail safe.

SUMMARY OF THE INVENTION

The present invention resides in the rear hub in a secondary pressure spring located behind a stationary star ratchet in the free hub, thus making the stationary star ratchet moveable. Since the original and current designs use only one pressure spring to keep positive the engagement and are very vulnerable to slipping and loss of engagement, the secondary pressure spring allows the once stationary star ratchet to move into the other sprung star ratchet preventing any loss of contact between the two star ratchets creating a fail safe or safety mechanism.

The secondary pressure spring was installed behind the stationary star ratchet by removing a circlip from behind the inboard bearing of the free hub. The inboard bearing was then shifted into the former position of the removed circlip, and a distance bushing between the two bearings in the free hub was reduced to allow the inboard bearing in the free hub to shift back. Then a spacer (of the same thickness of the material that was removed from the distance bushing) was installed in-between the steel spacer and the inboard hub shell bearing to maintain the correct tolerances when the hub was reassembled. All of this was necessary to create the space needed to accommodate the secondary pressure spring.

The results are: a fail safe (prevention of accidental disengagement), reduced frictional resistance, a quieter ratcheting noise, and quicker engagement. It improves the original and current designs by 70% and is adaptable in all past and current designs of many rear bicycle hubs.

DETAILED DESCRIPTION OF THE PREFERRED EMBODIMENTS

1. A Brief Explanation of how the Original Single Pressure Spring Design Worked

Figure 1:
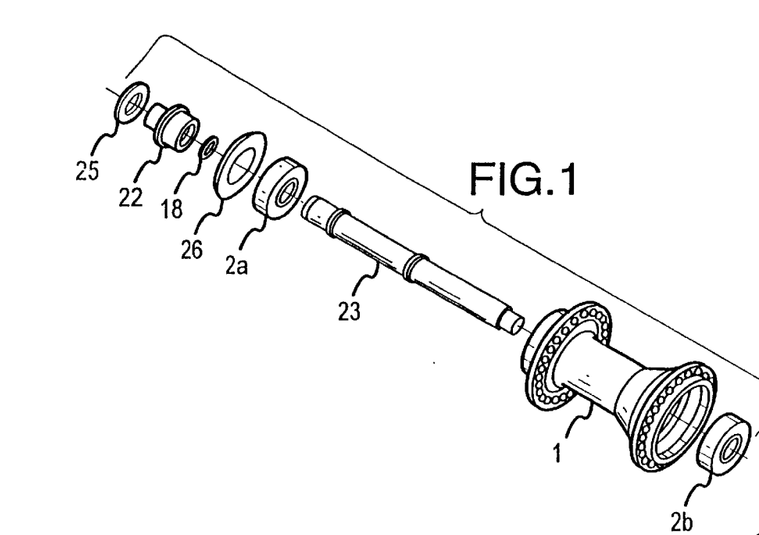
FIG. 1 is a perspective exploded view of the hub shell complete with two bearings, an axle, dust cap and an end adapter.

Refer to FIG. 1. The hub shell 1 is the central unit of the bicycle hub which connects the spokes to the rim and tire making a complete wheel. Inside of hub shell 1, are two bearings 2a and 2b on either side of the hub shell pressed in with an axle 23 inserted through their centers. Dust cap 26 protects bearing 2a from outside elements and parts 25, 22, and 18 make up the end adapter that connects the end portion of the axle into the drop out mounts of the bicycle frame, and or where the hub fits into the bicycle and is bolted in place via a quick release.

Figures 2, 3:
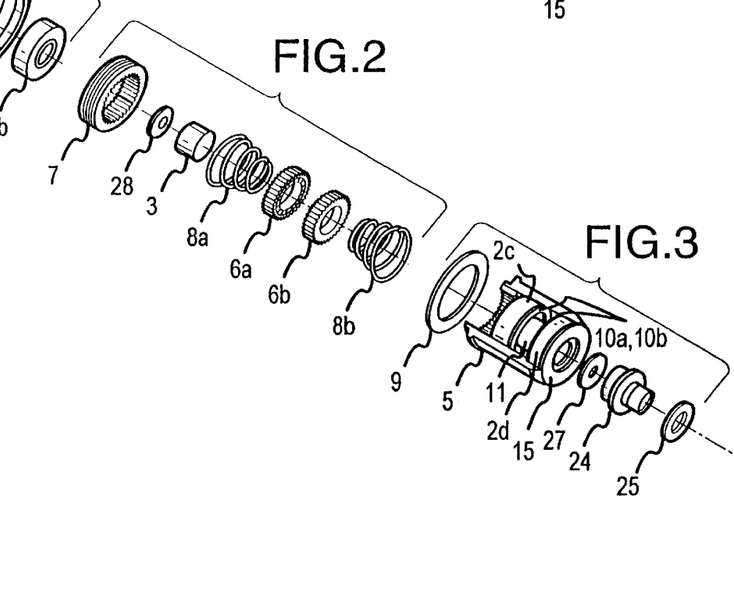
FIG. 2 is a perspective exploded view of the internal drive assembly for the free hub containing a threaded guide ring, two star ratchets, a steel spacer and washer, and two pressure springs.
FIG. 3 is a perspective cut-a-way view of the free hub body which contains a seal, two bearings, two circlips, a distance bushing, a dust cap and washer, and an end adapter.

Refer to FIG. 2. The drive assembly consists of a female threaded guide ring 7, two splined star ratchets 6a and 6b, a pressure spring 8a, and a steel spacer 3 to interconnect the axle races of bearings 2b and 2c so that the free hub FIG. 3 can rotate freely on the bearings. The star ratchets 6a and 6b are interchangeable flat 26 mm×5 mm cast steel discs with 18 or 40 unidirectional ramp teeth around the circumference of one side and smooth on the other side. The two star ratchets oppose (face) each other, teeth to teeth. Since the star ratchets are the same, opposing them into each other allows them to interlock in the forward direction or separate in the opposite direction. The female guide ring 7 that is threaded into hub shell guides the movable star ratchet 6a and star ratchet 6a is backed by a light pressure spring 8a to move it in and out of engagement with the opposite stationary star ratchet 6b. Refer to FIG. 2. The stationary star ratchet 6b is located in the free hub body 5. Refer to FIG. 3. The teeth of the two star ratchets 6a and 6b interlock when the wheel is driven forward, the spring 8a keeps star ratchet 6a positively engaged with star ratchet 6b. The free wheel mechanism is activated and the drive mode is disengaged, when pedaling backward the free hub FIG. 3. while the bicycle is moving forward and or coasting. The star ratchets 6a and 6b separate from each other because of the unidirectional ramp teeth. The spring 8a is constantly applying pressure to the movable star ratchet 6a and once there is pedal force moving the free hub FIG. 3 in the forward direction, star ratchet 6a then moves outward under spring tension into the stationary star ratchet 6b causing the free hub FIG. 3 to engage and rotate with the hub shell 1 propelling the bicycle forward.

Refer to FIG. 3. The free hub housing 5 which contains two bearings, 2c and 2d, two circlips, 10a and 10b which hold bearings 2c and 2d in place, a distance bushing 11 which interconnects the axle races of bearings 2c and 2d, a dust cap 15 to protect bearing 2d from the outside elements, a washer 27 (for mountain bike hub only), and 24 and 25 make up the drive side adapter. The free hub FIG. 3. is what rotates to either engage or disengage the drive assembly. The free hub body 5 is splined for a cassette or cog, which is a cluster of different gears that (not shown) is driven by a chain and shifted by a derailer (also not shown) and is what connects the rear drive train to the front chain rings, cranks and pedals. The free hub carries the cog set or cassette used in any standard 18, 21, 24, and 27 geared bicycles and also in BMX. The free hub is what gives the rear wheel the ability to rotate without moving the chain and pedals. Simply put, the rider can coast down a hill and keep stationary his/her feet, but once the rider starts to pedal forward the free hub engages and the person has power to propel the bicycle forward.

The problem with the single spring design is that any type of contamination; grease break down, worn spring tension or other worn parts, or neglect can cause the movable star ratchet 6a to stay disengaged and the free hub FIG. 3, instead of interlocking with the hub shell 1, slips past the interlocking teeth of star ratchet 6a and the hub fails which could cause serious injury to the rider. Even the slightest separation between the ratchets has catastrophic results to the hub's functionality. There are no fail safe or safeties built in if the hub should fail. There is, therefore, a recognized need for a secondary pressure spring for a rear hub to maintain proper engagement.

2. Description of the Secondary Pressure Spring Invention

Figure 4:
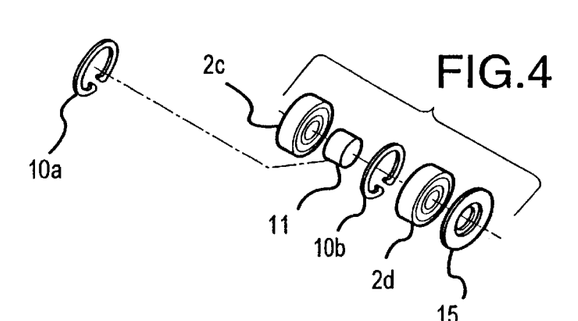
FIG. 4 is a perspective exploded view of the free hub internals mentioned in FIG. 3.
Figure 5:
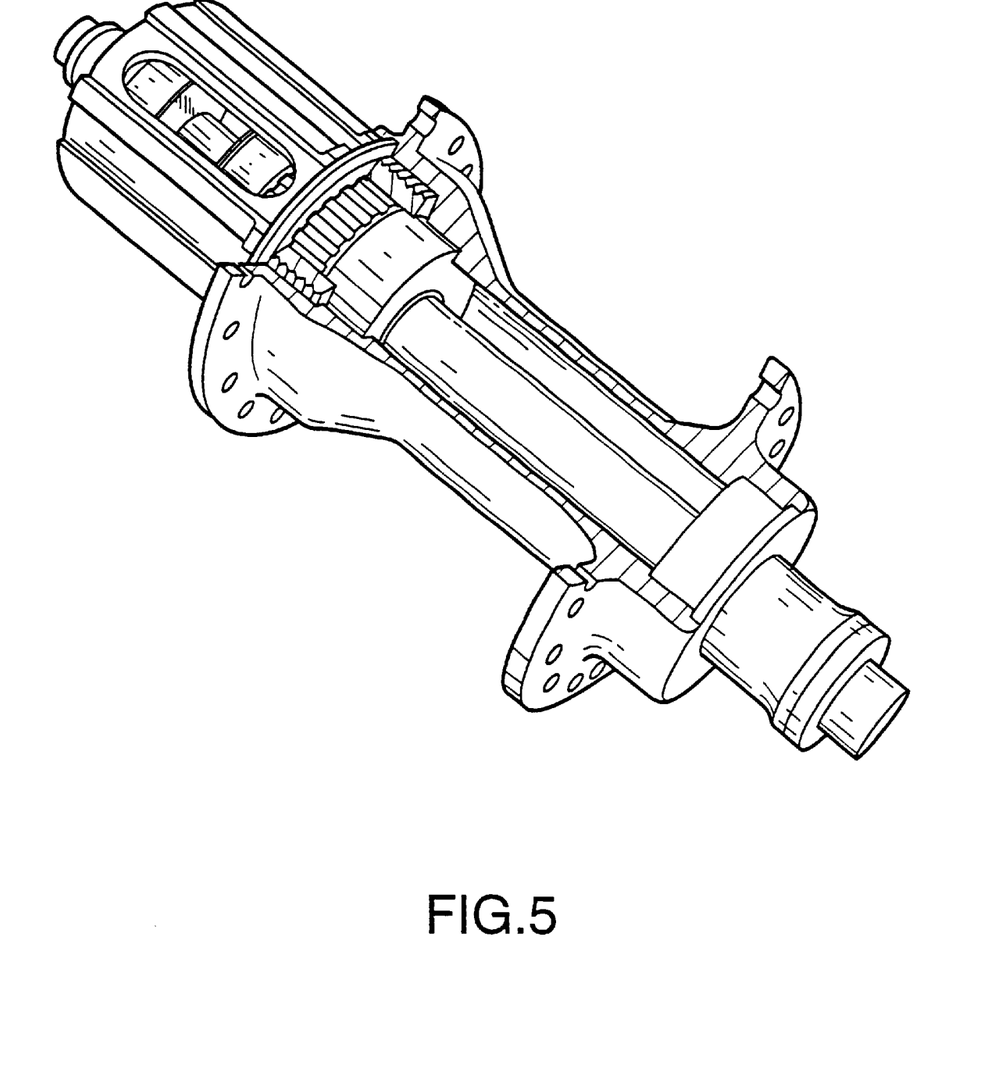
FIG. 5 is a perspective cut-a-way view of a hub showing some internal arrangement of the free hub and drive assembly.

This invention is the improvement of a rear hub with the addition of a secondary pressure spring located between the stationary star ratchet 6b and bearing 2c in the free hub body 5. Refer to FIGS. 2 and 3. This allows the star ratchets 6a and 6b to stay constantly engaged. If one star ratchet should be hindered or not move completely the opposite star ratchet will take up the slack. The original and current designs use only one spring to keep positive the engagement and are very vulnerable to slipping or loss of engagement when the sprung star ratchet 6a stays disengaged. I went on to discover, on a cut-away hub model, Refer to FIG. 5, how the spring 8a moved the star ratchet 6a in and out of engagement and could easily cause the hub to slip or fail by slightly manipulating the movement of the sprung star ratchet 6a, by holding it in the disengaged position. It was via the cut-away in FIG. 5, that I noticed that by reducing and moving the certain parts in the free hub I could accommodate a second pressure spring 8b to make the stationary star ratchet 6b active. After installing the second spring 8b, I tried the same method of holding the sprung star ratchet 6a in the disengagement position to make the hub fail but the once-stationary star ratchet 6b traveled across and kept the engagement positive. Refer to FIGS. 2, 3, and 4. I could not make the hub fail through this initial test.

Refer to FIG. 2. I incorporated the secondary pressure spring 8b within the free hub FIG. 3 by first measuring the thickness of a compressed spring to determine how much to adjust certain parts by. 1.39 mm was measured. And, since the star ratchets are interchangeable I made sure that the free hub FIG. 3 had the necessary splines to guide star ratchet 6b properly and freely. Refer to FIG. 4. The removal of circlip 10a was necessary in order to shift bearing 2c back 1.39 mm to make the needed space for the second pressure spring 8b. Refer to FIG. 2. In order to shift bearing 2c, the distance bushing 11 between bearings 2c and 2d in FIG. 4., needed to be reduced by 1.39 mm making it have an overall length of 9.83 mm. Refer to FIG. 4. Since there was 1.39 mm of material removed from the distance bushing 11 in FIG. 4., the material needed to be displaced somewhere else in the hub. So, a 1.39 mm thick spacer 28 that had a bore hole of 10 mm was installed between bearing 2b and the steel spacer 3 in order to maintain the correct tolerances when the hub was reassembled. Refer to FIGS. 1 and 2. After everything was modified in order to make the needed space, a second pressure spring 8b was installed between star ratchet 6b and bearing 2c, and the hub reassembled.

3. Additional Design Alternative

I also have a second method of installing the second pressure spring 8b, by "thinning" the two star ratchets 6a and 6b (taking 0.70 mm of material from both back sides of the ratchets), this provides an alternative to the design change. Meaning, rather than changing the dimensions of certain parts and moving things around, as mentioned in FIGS. 2, 3, and 4, I was able to achieve the same results by simply reducing the thickness of the two star ratchet to accommodate the secondary pressure spring 8b.

4. What Does the Second Pressure Spring do for the Current Design

The DT® Hugi® hub has been re-designed several times since its conception in 1994, but the double-spring idea created a fail-safe for such designs. It keeps its engagement in cold weather starts; it has quicker engagement; it makes the hub quieter; it has less frictional resistance; and can be adapted to all models, from 1995 through 1998. It has been said by the Swiss that the double spring design alone improves the hub by 70%.

5. Description of Reversible Star Ratchet

Figure 6A:
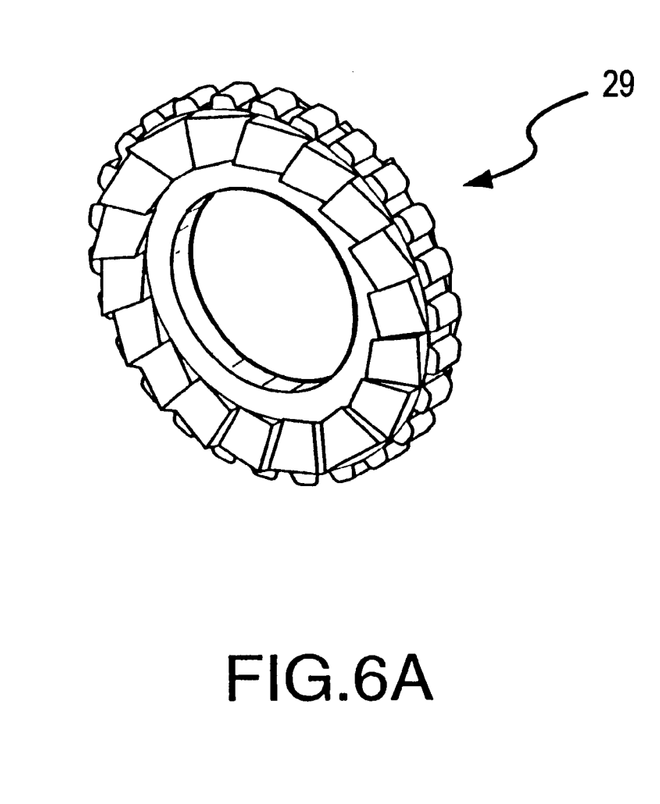
FIGS. 6a and 6b are left and right views of a reversible star ratchet element according to one embodiment.
Figure 6B:
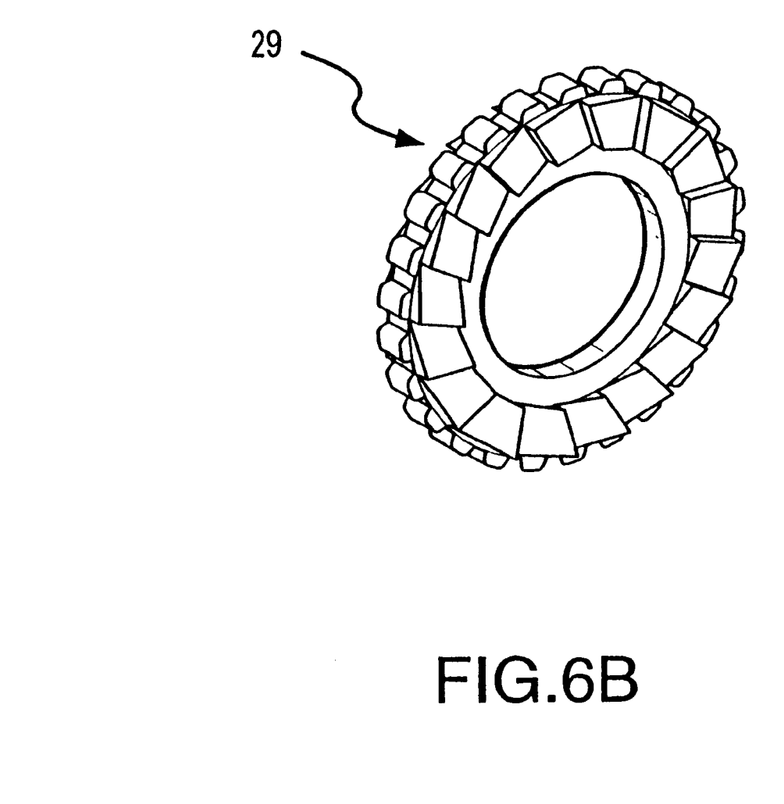

Another design alternative which provides a type of redundant or alternatively failsafe alternative—and which can be used with or without the above redundant or fail-safe design—is shown in FIGS. 6a and 6b. As can be easily understood, from this design, the failure of a drive element can be solved by providing a seemingly unnecessary drive element as a backup. Most importantly, this can be provided as part of the existing drive design so that, should the drive fail, this alternative element can be used in its place. Thus, by using the an element such as (but not limited to) that shown in FIGS. 6a–6b, an alternative drive element can be used in place of the failed element. This can be most easily understood by reference to the preferred design, that of the star ratchet drive mechanism.

Referring to FIGS. 6a–6b, a reversible star ratchet 29 is shown. If this is used in place of one or more of the star ratchets shown in FIG. 2, this element can serve as an unengagable drive element. For instance, by replacing the two star ratchets 6a and 6b in FIG. 2 with reversible star ratchets 29, an additional level of redundancy is provided. As can be understood, since one face of the reversible star ratchet 29 is not able to be engagable, it is not likely to be damaged in the event of a drive failure. If the engaged face of the reversible star ratchet 29 served as a unitary disengagable drive element, in the event of damage, the opposite face could be used. Naturally, an entirely separate element could be provided as well, but since the opposite face is available, it is seen as most efficient to avoid a higher parts count for this feature.

Since a star ratchet or other such unitary arrangement is one where only one element is used or moved for the drive, if it were to become damaged, it could cause complete failure of any drive capability. Further, by such an arrangement, a failure could or would most likely cause damage to the recipient drive mechanism (the second star ratchet in FIG. 2). Thus, by providing each of the dual star ratchets 6a and 6b as dual reversible star ratchets 29 both of these items could be repaired by merely reversing them.

The actual replacement operation could be quite simple. The wheel could be removed and the hub opened—with or without special tools depending upon the hub design chosen. Some portion of the disengagable drive element or assembly could be removed and replaced with the unengagable drive element. In the design shown, this could be accomplished by simply reversing the star ratchet drive elements. Finally the hub could be reassembled and then the disengagable drive assembly or the step of engaging could be reinstituted with reliability to be able to reach an appropriate repair station.

Attachment of an unengagable element could be wither external, or as the internal, preferred attachment shown. For example, by attaching any item to the hub and then attaching the unengagable drive element to that element (with or without any number of intervening hub-type or other required elements), the unengagable drive element would be considered as attached to the hub or the hub encasing. In addition, by containing the unengagable drive element in the encasing or by providing an internal element such as the star ratchet 6a or 6b the unengagable drive element could be provided enclosed within the hub encasing itself. This, of course could protect the unengagable drive element from weather or operational conditions and could keep the element from being lost or removed so that it would always be available when needed.

Finally, as mentioned earlier, the star ratchet arrangement is only one possibility. Any unengagable element, any reversible element, or the like could be used. This preferred arrangement is but one way in which to achieve the teaching of this invention. Further, it should be understood that the unengagable drive element can be combined with any of the claimed or disclosed arrangements of the fail-safe engagement element; all combinations and permutations are simply not set forth for efficiency's sake.

The discussion included in this patent is intended to serve as a basic description. The reader should be aware that the specific discussion may not explicitly describe all embodiments possible; many alternatives are implicit. It also may not explicitly explain the generic nature of the invention and may not explicitly show how each feature or element can actually be representative of a broader function or of a great variety of alternative or equivalent elements. Again, these are implicitly included in this disclosure. Where the invention is described in process-oriented terminology, each element of the process may be implicitly performed by a device. Process or method claims may not only be included for the process described, but also apparatus claims may be included to address the devices which perform the invention as well as claims directed to the end product produced in these fashions. Neither the description nor the terminology is intended to limit the scope of the claims.

Further, equivalent, broader, and more generic terms are also implicit in the prior description of each element. Such terms can be substituted when desired to make explicit the implicitly broad coverage to which this invention is entitled. Further, it should be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and broad methods or processes and the like are encompassed by this disclosure. It should be understood that this application is designed to yield a patent covering numerous aspects of the invention both independently and as an overall system as well as the products produced by this invention.

Thus, the applicant should be understood have support to claim at least: i) devices, components, and systems useful for improved star ratchet-style bicycle hub using a secondary pressure spring, ii) the related methods disclosed and described in this application, iii) similar, equivalent, and even implicit variations of each of the methods, iv) those alternative designs which accomplish each of the functions shown as are disclosed and described, v) those alternative designs and devices which accomplish each of the functions disclosed and described, vi) each feature, component, and step shown as separate and independent inventions, vii) substances produced through the use of these processes and systems, and viii) the various combinations and permutations of each of the above.

I claim:

1. A freewheeling bicycle apparatus comprising:
   a. an encasing;
   b. an axle element to which said encasing is responsive;
   c. a disengagable drive assembly having a unitary disengagable drive element; and
   d. a fail safe engagement element which engages said unitary drive element.

2. A freewheeling bicycle apparatus as described in claim 1 wherein said unitary disengagable drive element comprises at least one star ratchet.

3. A freewheeling bicycle apparatus as described in claim 2 wherein said unitary disengagable drive element comprises at least two interchangable star ratchets.

4. A freewheeling bicycle apparatus as described in claim 2 wherein said disengagable drive assembly comprises:
   a. a hub engagement element; and
   b. a free hub engagement element.

5. A freewheeling bicycle apparatus as described in claim 4 wherein said fail safe engagement element comprises at least on spring.

6. A freewheeling bicycle apparatus as described in claim 5 wherein said at least one spring comprises at least one coil spring.

7. A freewheeling bicycle apparatus as described in claim 4 wherein said fail safe engagement element comprises a plurality of springs.

8. A freewheeling bicycle apparatus as described in claim 7 wherein said plurality of springs comprises at least two opposing springs.

9. A freewheeling bicycle apparatus as described in claim 7 wherein said plurality of springs comprises at least one coil spring.

10. A freewheeling bicycle apparatus as described in claim 9 wherein said plurality of spring comprises at least one opposing coil springs.

11. A freewheeling bicycle apparatus as described in claim 7 wherein said plurality of springs comprises:
   a. a pressure spring; and
   b. a secondary pressure spring.

12. A freewheeling bicycle apparatus as described in claim 11 and further comprising:
   a. a hub bearing; and
   b. a free hub bearing,
   wherein said hub engagement element comprises a hub ratchet, and
   wherein said free hub engagement element comprises a free hub ratchet, and wherein said secondary pressure spring is positioned between said free hub bearing and said free hub ratchet.

13. A freewheeling bicycle apparatus as described in claim 2 further comprising a reduced distance bushing to which said disengagable drive assembly is responsive.

14. A freewheeling bicycle apparatus as described in claim 13 wherein said fail safe engagement element comprises a spring which has a compressed spring thickness and wherein said reduced distance bushing comprises a bushing reduced by about said compressed spring thickness.

15. A freewheeling bicycle apparatus as described in claim 13 and further comprising a compressed spring thickness spacer.

16. A freewheeling bicycle apparatus as described in claim 14 and further comprising a compressed spring thickness spacer.

17. A freewheeling bicycle apparatus as described in claim 13 and further comprising:
   a. a plurality of spokes which are responsive to said encasing; and
   b. a wheel which is responsive to said plurality of spokes.

18. A freewheeling bicycle apparatus as described in claim 17 and further comprising:
   a. a tire which is responsive to said wheel;
   b. a chain to which said disengagable drive assembly is responsive;
   c. a derailler to which said chain is responsive;
   d. mounts to which said axle element is responsive;
   e. a bicycle frame to which said mounts are attached;
   f. a crank attached to said bicycle frame and which engages said chain; and
   g. pedals to which said crank is responsive.

19. A freewheeling bicycle apparatus as described in claim 2 wherein said unitary disengagable drive element comprises at least one thinned star ratchet.

20. A freewheeling bicycle apparatus as described in claim 19 wherein said fail safe engagement element comprises a spring which has a compressed spring thickness and wherein said wherein said at least one thinned star ratchet comprises a thinned star ratchet thinned by about said compressed spring thickness.

21. A freewheeling bicycle apparatus as described in claim 19 and further comprising:
   a. a plurality of spokes which are responsive to said encasing; and
   b. a wheel which is responsive to said plurality of spokes.

22. A freewheeling bicycle apparatus as described in claim 21 and further comprising:
   a. a tire which is responsive to said wheel;
   b. a chain to which said disengagable drive assembly is responsive;
   c. a derailler to which said chain is responsive;
   d. mounts to which said axle element is responsive;
   e. a bicycle frame to which said mounts are attached;
   f. a crank attached to said bicycle frame and which engages said chain; and
   g. pedals to which said crank is responsive.

23. A freewheeling bicycle apparatus as described in claim 2 wherein said unitary disengagable drive element comprises two thinned star ratchets.

24. A freewheeling bicycle apparatus as described in claim 23 wherein said fail safe engagement element comprises a spring which has a compressed spring thickness and wherein said wherein said two thinned star ratchet each comprise a thinned star ratchet thinned by about one-half of said compressed spring thickness.

25. A freewheeling bicycle apparatus as described in claim 2 further comprising at least one reversible star ratchet.

26. A freewheeling bicycle apparatus as described in claim 1 wherein said disengagable drive assembly comprises a free hub drive assembly.

27. A freewheeling bicycle apparatus as described in claim 1 wherein said fail safe engagement element comprises a fail safe mechanism.

28. A freewheeling bicycle apparatus as described in claim 27 wherein said fail safe mechanism comprises a redundant engagement element.

29. A freewheeling bicycle apparatus as described in claim 28 wherein said redundant engagement element comprises at least two engagement elements.

30. A freewheeling bicycle apparatus as described in claim 28 wherein said redundant engagement element comprises a bias element.

31. A freewheeling bicycle apparatus as described in claim 28 wherein said redundant engagement element comprises at least two bias elements.

32. A freewheeling bicycle apparatus as described in claim 28 wherein said encasing comprises:
   a. a hub shell;
   b. a free hub body;
and wherein said axle element comprises an axle and further comprising at least two bearings to which said axle is responsive.

33. A freewheeling bicycle apparatus as described in claim 32 wherein said fail safe mechanism comprises a rear hub mechanism at least a portion of which is internal to said encasing.

34. A freewheeling bicycle apparatus as described in claim 32 wherein said fail safe mechanism comprises an internal rear hub mechanism.

35. A freewheeling bicycle apparatus as described in claim 32 further comprising a gear array to which said encasing is responsive.

36. A freewheeling bicycle apparatus as described in claim 35 wherein said gear array comprises a cog set.

37. A freewheeling bicycle apparatus as described in claim 36 wherein said disengagable drive assembly comprises:
   a. a hub engagement element; and
   b. a free hub engagement element.

38. A freewheeling bicycle apparatus as described in claim 37 wherein said redundant engagement element comprises at least one spring.

39. A freewheeling bicycle apparatus as described in claim 33 wherein said at least one spring comprises at least one coil spring.

40. A freewheeling bicycle apparatus as described in claim 37 wherein said fail safe engagement element comprises a plurality of springs.

41. A freewheeling bicycle apparatus as described in claim 40 wherein said plurality of springs comprises at least two opposing springs.

42. A freewheeling bicycle apparatus as described in claim 40 wherein said plurality of springs comprises at least one coil spring.

43. A freewheeling bicycle apparatus as described in claim 42 wherein said plurality of springs comprises at least two opposing coil springs.

44. A freewheeling bicycle apparatus as described in claim 40 wherein said plurality of springs comprises:
  a. a pressure spring; and
  b. a secondary pressure spring.

45. A freewheeling bicycle apparatus as described in claim 43 and further comprising:
  a. a plurality of spokes which are responsive to said encasing; and
  b. a wheel which is responsive to said plurality of spokes.

46. A freewheeling bicycle apparatus as described in claim 45 and further comprising:
  a. a tire which is responsive to said wheel;
  b. a chain to which said disengagable drive assembly is responsive;
  c. a derailler to which said chain is responsive;
  d. mounts to which said axle element is responsive;
  e. a bicycle frame to which said mounts are attached;
  f. a crank attached to said bicycle frame and which engages said chain; and
  g. pedals to which said crank is responsive.

47. A freewheeling bicycle apparatus as described in claim 37 and further comprising:
  a. a hub bearing; and
  b. a free hub bearing,
wherein said hub engagement element comprises a hub ratchet, and wherein said free hub engagement element comprises a free hub ratchet, and wherein said secondary pressure spring is positioned between said free hub bearing and said free hub ratchet.

48. A freewheeling bicycle apparatus as described in claim 47 wherein said hub ratchet and said free hub ratchet comprise interchangable star ratchets.

49. A freewheeling bicycle apparatus as described in claim 36 and further comprising a reduced distance bushing to which said disengagable drive assembly is responsive.

50. A free heeling bicycle apparatus as described in claim 49 wherein said fail safe engagement element comprises a spring which has a compressed spring thickness and wherein said reduced distance bushing comprises a bushing reduced by about said compressed spring thickness.

51. A freewheeling bicycle apparatus as described in claim 49 and further comprising a compressed spring thickness spacer.

52. A freewheeling bicycle apparatus as described in claim 50 and further comprising a compressed spring thickness spacer.

53. A freewheeling bicycle apparatus as described in claim 28 wherein said disengagable drive assembly comprises:
  a. a hub engagement element; and
  b. a free hub engagement element.

54. A freewheeling bicycle apparatus as described in claim 53 wherein said redundant engagement element comprises at least one spring.

55. A freewheeling bicycle apparatus as described in claim 54 wherein said at least one spring comprises at least one coil spring.

56. A freewheeling bicycle apparatus as described in claim 53 wherein said fail safe engagement element comprises a plurality of springs.

57. A freewheeling bicycle apparatus as described in claim 56 wherein said plurality of springs comprises at least two opposing springs.

58. A freewheeling bicycle apparatus as described in claim 56 wherein said plurality of springs comprises at least one coil spring.

59. A freewheeling bicycle apparatus as described in claim 58 wherein said plurality of springs comprises at least two opposing coil springs.

60. A freewheeling bicycle apparatus as described in claim 56 wherein said plurality of springs comprises:
  a. a pressure spring; and
  b. a secondary pressure spring.

61. A freewheeling bicycle apparatus as described in claim 60 wherein said unitary disengagable drive element comprises at least one star ratchet.

62. A freewheeling bicycle apparatus as described in claim 61 and further comprising:
  a. a hub bearing; and
  b. a free hub bearing,
wherein said hub engagement element comprises a hub ratchet, and wherein said free hub engagement element comprises a free hub ratchet, and wherein said secondary pressure spring is positioned between said free hub bearing and said free hub ratchet.

63. A freewheeling bicycle apparatus as described in claim 62 wherein said hub ratchet and said free hub ratchet comprise interchangable star ratchets.

64. A freewheeling bicycle apparatus as described in claim 36 and further comprising:
  a. a plurality of spokes which are responsive to said encasing; and
  b. a wheel which is responsive to said plurality of spokes.

65. A freewheeling bicycle apparatus as described in claim 64 and further comprising a tire which is responsive to said wheel.

66. A freewheeling bicycle apparatus as described in claim 65 and further comprising:
  a. a chain to which said disengagable drive assembly is responsive;
  b. a derailer to which said chain is responsive;
  c. mounts to which said axle element is responsive;
  d. a bicycle frame to which said mounts are attached;
  e. a crank attached to said bicycle frame and which engages said chain; and
  f. pedals to which said crank is responsive.

67. A freewheeling bicycle apparatus as described in claim 1 further comprising:
  a. a plurality of spokes which are responsive to said encasing; and
  b. a wheel which is responsive to said plurality of spokes.

68. A freewheeling bicycle apparatus as described in claim 67 and further comprising a tire which is responsive to said wheel.

69. A freewheeling bicycle apparatus as described in claim 68 and further comprising:
   a. a chain to which said disengagable drive assembly is responsive;
   b. mounts to which said axle element is responsive;
   c. a bicycle frame to which said mounts are attached;
   d. a crank attached to said bicycle frame and which engages said chain; and
   e. pedals to which said crank is responsive.

70. A freewheeling bicycle apparatus as described in claim 69 and further comprising an unengagable drive element contained within said encasing.

71. A freewheeling bicycle apparatus as described in claim 1 further comprising an unengagable drive element attached to said encasing.

72. A method of propelling a bicycle comprising the steps of:
   a. encasing a drive mechanism;
   b. guiding said drive mechanism about an axle element;
   c. unitarily engaging said drive mechanism in a manner in which a bicycle wheel responds to propel said bicycle; and
   d. at least temporarily fail safe engaging said drive mechanism in a manner in which said bicycle wheel responds.

73. A method of propelling a bicycle as described in claim 72 and further comprising the step of periodically disengaging said drive mechanism.

74. A method of propelling a bicycle as described in claim 73 wherein said step of unitarily engaging said drive mechanism in a manner in which a bicycle wheel responds to propel said bicycle comprises the step of star ratcheting said drive mechanism.

75. A method of propelling a bicycle as described in claim 74 wherein said step of star ratcheting said drive mechanism comprises the step of utilizing interchangable ratchets.

76. A method of propelling a bicycle as described in claim 74 further comprising the step of attaching a reversible star ratchet to said encasing.

77. A method of propelling a bicycle as described in claim 73 wherein said step of periodically disengaging said drive mechanism comprises the step of freewheeling.

78. A method of propelling a bicycle as described in claim 77 wherein said step of at least temporarily fail safe engaging said drive mechanism in a manner in which said bicycle wheel responds comprises the step of redundantly engaging said drive mechanism.

79. A method of propelling a bicycle as described in claim 78 wherein said step of redundantly engaging said drive mechanism comprises the step of biasing said drive mechanism.

80. A method of propelling a bicycle as described in claim 78 wherein said step of redundantly engaging said drive mechanism comprises the step of separately biasing said drive mechanism.

81. A method of propelling a bicycle as described in claim 78 wherein said step of redundantly engaging said drive mechanism comprises the step of internally engaging said drive mechanism.

82. A method of propelling a bicycle as described in claim 73 wherein said step of periodically disengaging said drive mechanism comprises the step of springing said drive mechanism.

83. A method of propelling a bicycle as described in claim 82 wherein said step of springing said drive mechanism comprises the step of coil springing said drive mechanism.

84. A method of propelling a bicycle as described in claim 82 wherein said step of springing said drive mechanism comprises the step of utilizing a plurality of springs.

85. A method of propelling a bicycle as described in claim 84 wherein said step of utilizing a plurality of springs comprises the step of arranging at least two of said spring to oppose each other.

86. A method of propelling a bicycle as described in claim 85 wherein said step of periodically disengaging said drive mechanism comprises the step of star ratcheting said drive mechanism and wherein said step of utilizing at least one element adjusted by the thickness of a compressed spring comprises the step of utilizing at least one thinned star ratchet.

87. A method of propelling a bicycle as described in claim 85 wherein said step of utilizing at least one thinned star ratchet comprises the step of utilizing two evenly thinned star ratchets which each are adjusted by one-half the thickness of said compressed spring.

88. A method of propelling a bicycle as described in claim 73 and further comprising the step of utilizing at least one compensated element to fit an existing design.

89. A method of propelling a bicycle as described in claim 88 wherein said step of utilizing at least one compensated element to fit an existing design comprises the step of utilizing at least one element adjusted by the thickness of a compressed spring utilized in said design.

90. A method of propelling a bicycle as described in claim 89 wherein said step of utilizing at least one element adjusted by the thickness of a compressed spring comprises the step of utilizing a reduced distance bushing.

91. A method of propelling a bicycle as described in claim 89 wherein said step of periodically disengaging said drive mechanism comprises the step of star ratcheting said drive mechanism and wherein said step of utilizing at least one element adjusted by the thickness of a compressed spring comprises the step of utilizing at least one thinned star ratchet.

92. A method of propelling a bicycle as described in claim 91 wherein said step of utilizing at least one thinned star ratchet comprises the step of utilizing two evenly thinned star ratchets which each are adjusted by one-half the thickness of said compressed spring.

93. A method of propelling a bicycle as described in claim 78 wherein said step of periodically disengaging said drive mechanism comprises the step of springing said drive mechanism.

94. A method of propelling a bicycle as described in claim 93 wherein said step of springing said drive mechanism comprises the step of coil springing said drive mechanism.

95. A method of propelling a bicycle as described in claim 93 wherein said step of springing said drive mechanism comprises the step of utilizing a plurality of springs.

96. A method of propelling a bicycle as described in claim 95 wherein said step of utilizing a plurality of springs comprises the step of arranging at least two of said spring to oppose each other.

97. A method of propelling a bicycle as described in claim 96 wherein said step of periodically disengaging said drive mechanism comprises the step of star ratcheting said drive mechanism.

98. A method of propelling a bicycle as described in claim 97 wherein said step of star ratcheting said drive mechanism comprises the step of utilizing interchangable ratchets.

99. A method of propelling a bicycle as described in claim 96 wherein said step of periodically disengaging said drive mechanism comprises the step of star ratcheting said drive mechanism and wherein said step of utilizing at least one element adjusted by the thickness of a compressed spring comprises the step of utilizing at least one thinned star ratchet.

100. A method of propelling a bicycle as described in claim 96 wherein said step of utilizing at least one thinned star ratchet comprises the step of utilizing two evenly thinned star ratchets which each are adjusted by one-half the thickness of said compressed spring.

101. A method of propelling a bicycle as described in claim 72 further comprising the step of multiple gearing said bicycle.

102. A method of propelling a bicycle as described in claim 101 wherein said step of periodically disengaging said drive mechanism comprises the step of springing said drive mechanism.

103. A method of propelling a bicycle as described in claim 102 wherein said step of springing said drive mechanism comprises the step of coil springing said drive mechanism.

104. A method of propelling a bicycle as described in claim 102 wherein said step of springing said drive mechanism comprises the step of utilizing a plurality of springs.

105. A method of propelling a bicycle as described in claim 104 wherein said step of utilizing a plurality of springs comprises the step of arranging at least two of said spring to oppose each other.

106. A method of propelling a bicycle as described in claim 105 wherein said step of periodically disengaging said drive mechanism comprises the step of star ratcheting said drive mechanism and wherein said step of utilizing at least one element adjusted by the thickness of a compressed spring comprises the step of utilizing at least one thinned star ratchet.

107. A method of propelling a bicycle as described in claim 105 wherein said step of utilizing at least one thinned star ratchet comprises the step of utilizing two evenly thinned star ratchets which each are adjusted by one-half the thickness of said compressed spring.

108. A method of propelling a bicycle as described in claim 72 further comprising the step of enclosing said unengagable drive element in said encasing.

* * * * *